(No Model.) 7 Sheets—Sheet 1.

H. WARDEN.
GAS ENGINE.

No. 486,143. Patented Nov. 15, 1892.

WITNESSES: INVENTOR:

(No Model.) 7 Sheets—Sheet 2.
H. WARDEN.
GAS ENGINE.
No. 486,143. Patented Nov. 15, 1892.
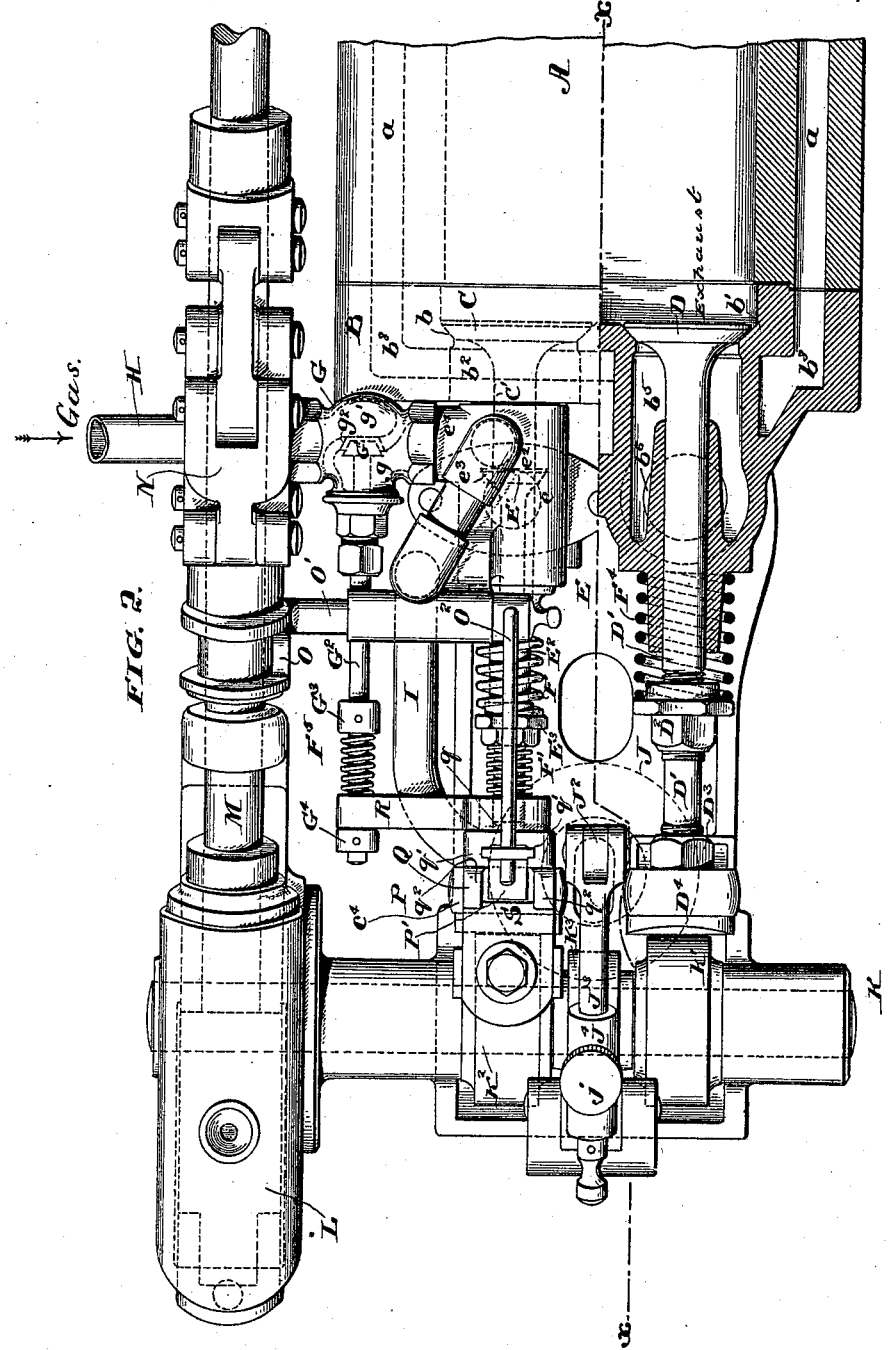
WITNESSES:
David S. Williams
Joshua Matlack, Jr.
INVENTOR:
Henry Warden
by his atty,
Francis T. Chambers

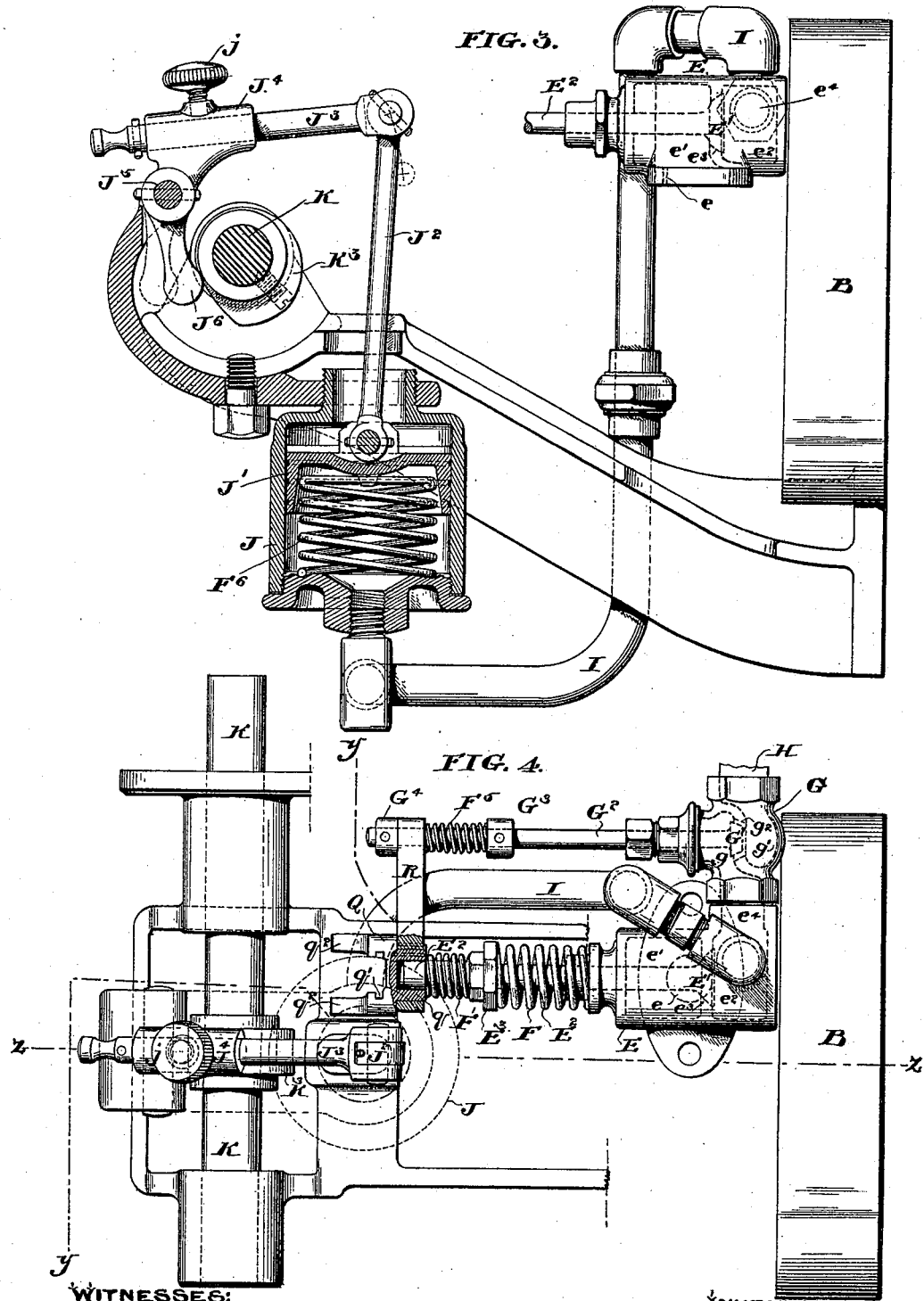

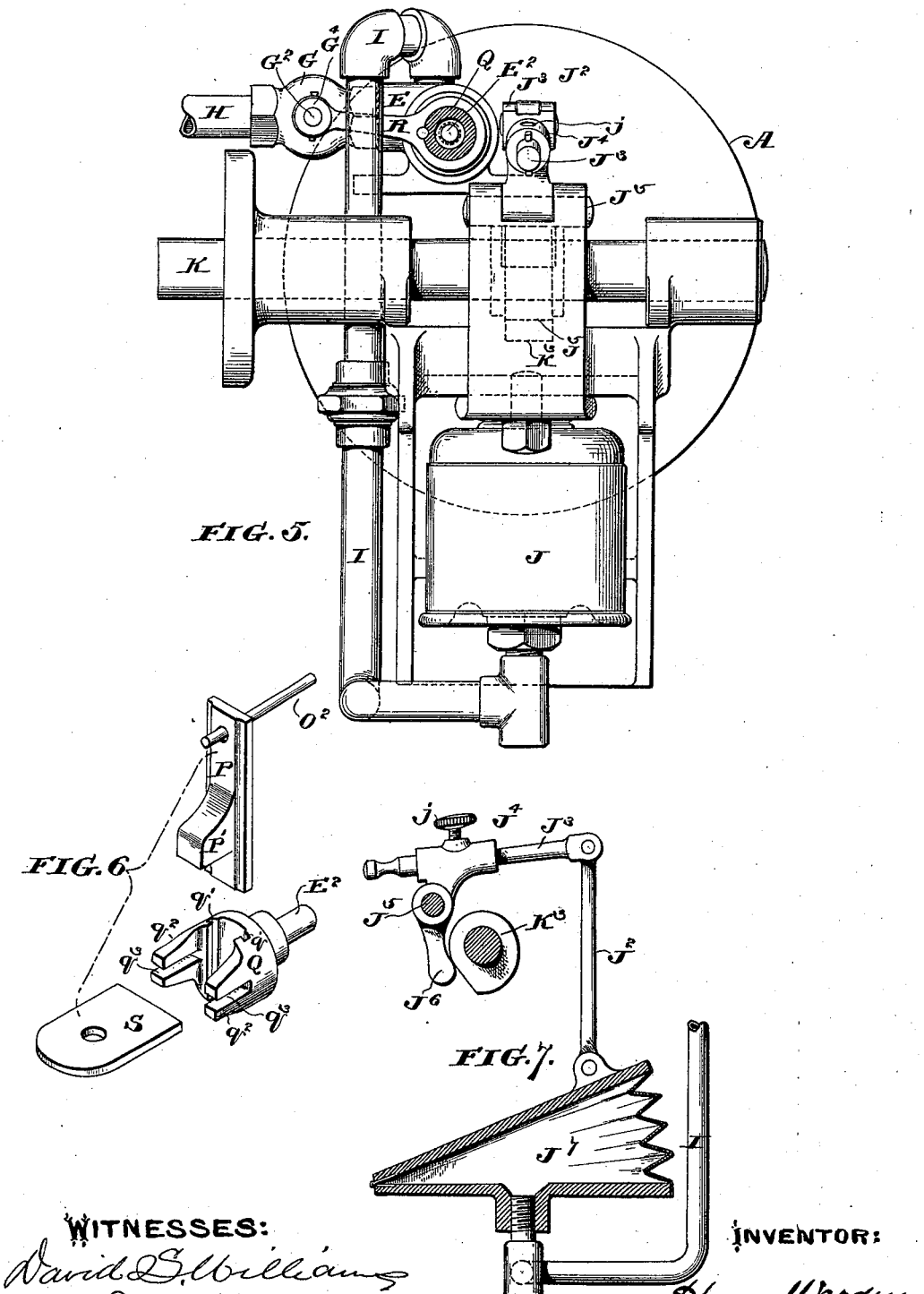

(No Model.) 7 Sheets—Sheet 5.

H. WARDEN.
GAS ENGINE.

No. 486,143. Patented Nov. 15, 1892.

(No Model.) 7 Sheets—Sheet 6.

H. WARDEN.
GAS ENGINE.

No. 486,143. Patented Nov. 15, 1892.

WITNESSES:
INVENTOR:

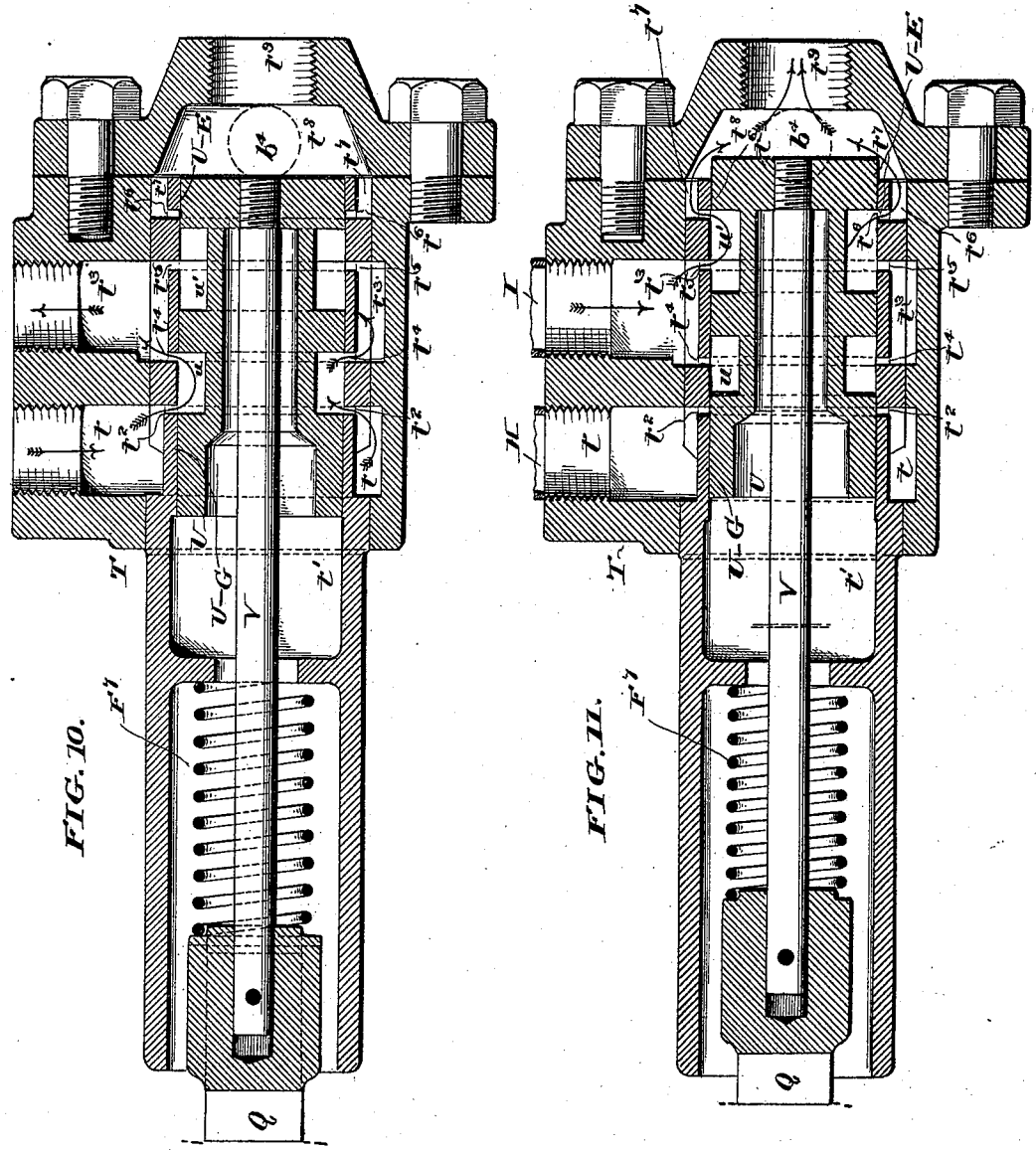

UNITED STATES PATENT OFFICE.

HENRY WARDEN, OF PHILADELPHIA, PENNSYLVANIA.

GAS-ENGINE.

SPECIFICATION forming part of Letters Patent No. 486,143, dated November 15, 1892.

Application filed July 31, 1890. Serial No. 360,435. (No model.)

*To all whom it may concern:*

Be it known that I, HENRY WARDEN, of the city and county of Philadelphia, State of Pennsylvania, have invented a certain new and useful Improvement in Gas-Engines, of which the following is a true and exact description, reference being had to the accompanying drawings, which form a part of this specification.

My invention relates to gas-engines, and has for its object to provide a uniform explosive mixture of gas and air to the cylinder of the engine.

The novel mechanism of which my invention consists will best be understood, as described, in connection with the drawings in which it is illustrated, and the features which I desire to protect by Letters Patent are hereinafter clearly pointed out in the claims.

Reference is now had to the drawings, in which—

Figure 1:
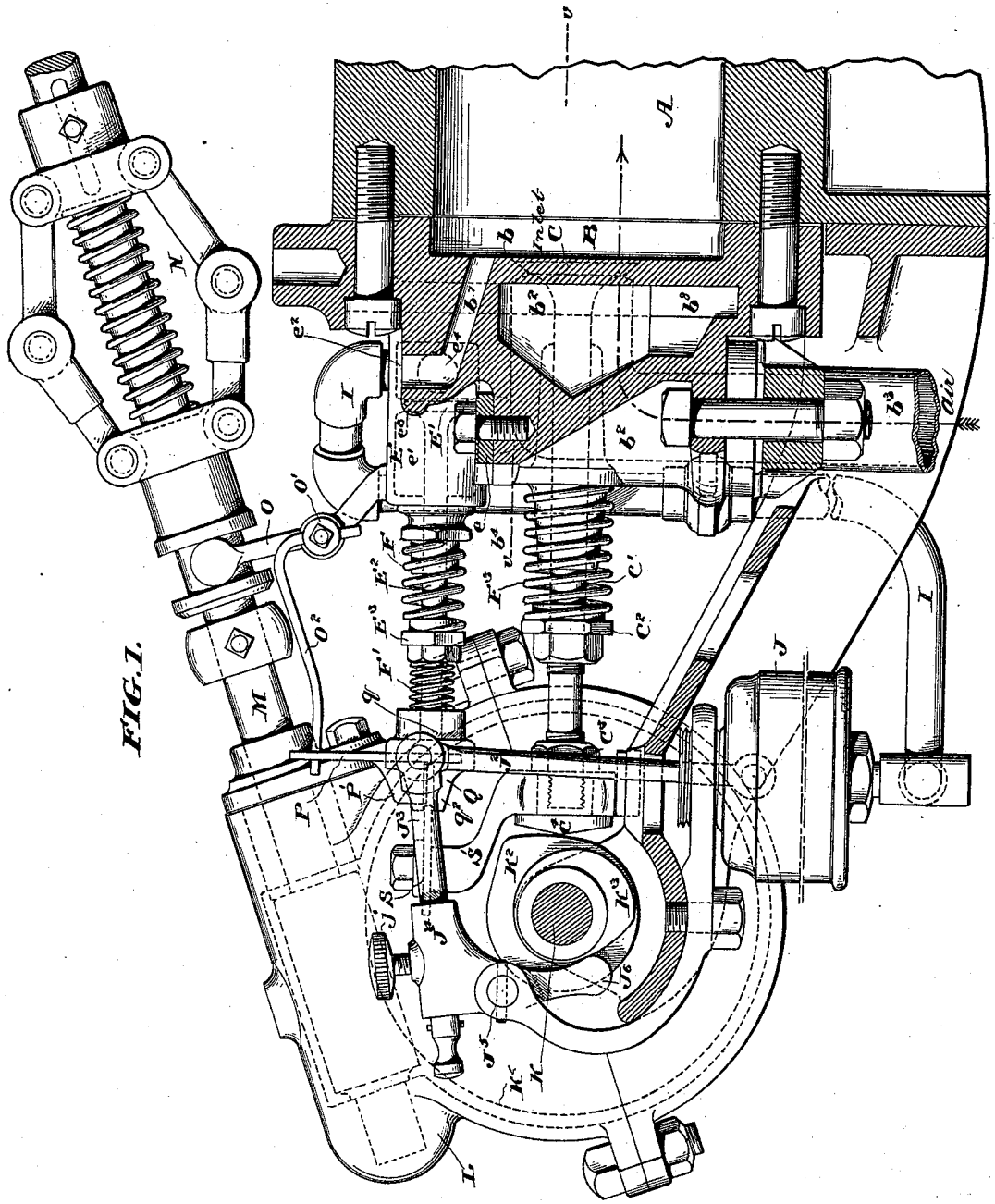
Figure 8:
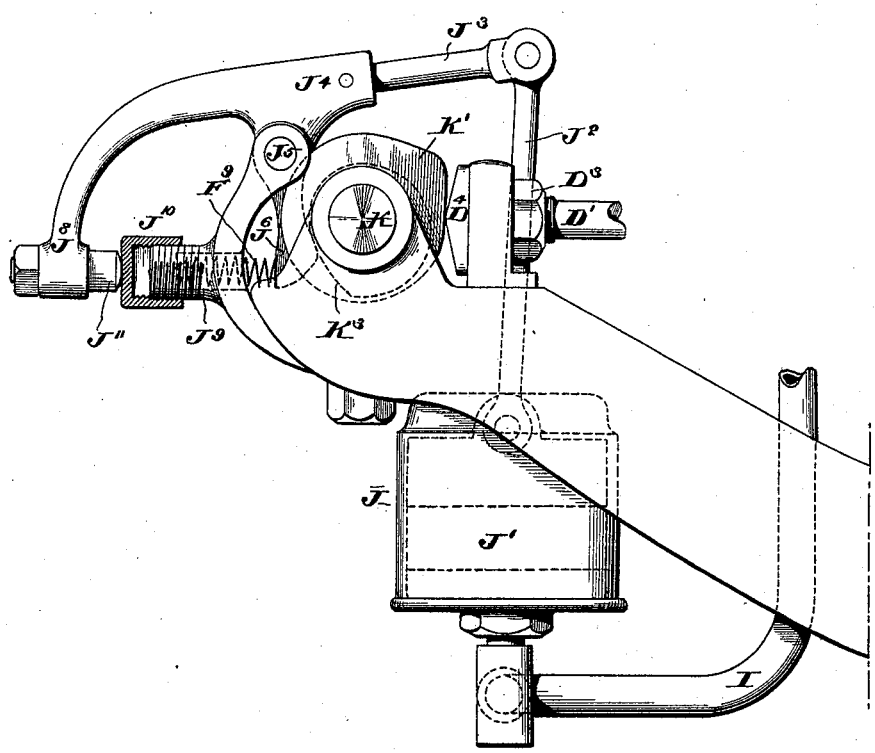
Figure 9:
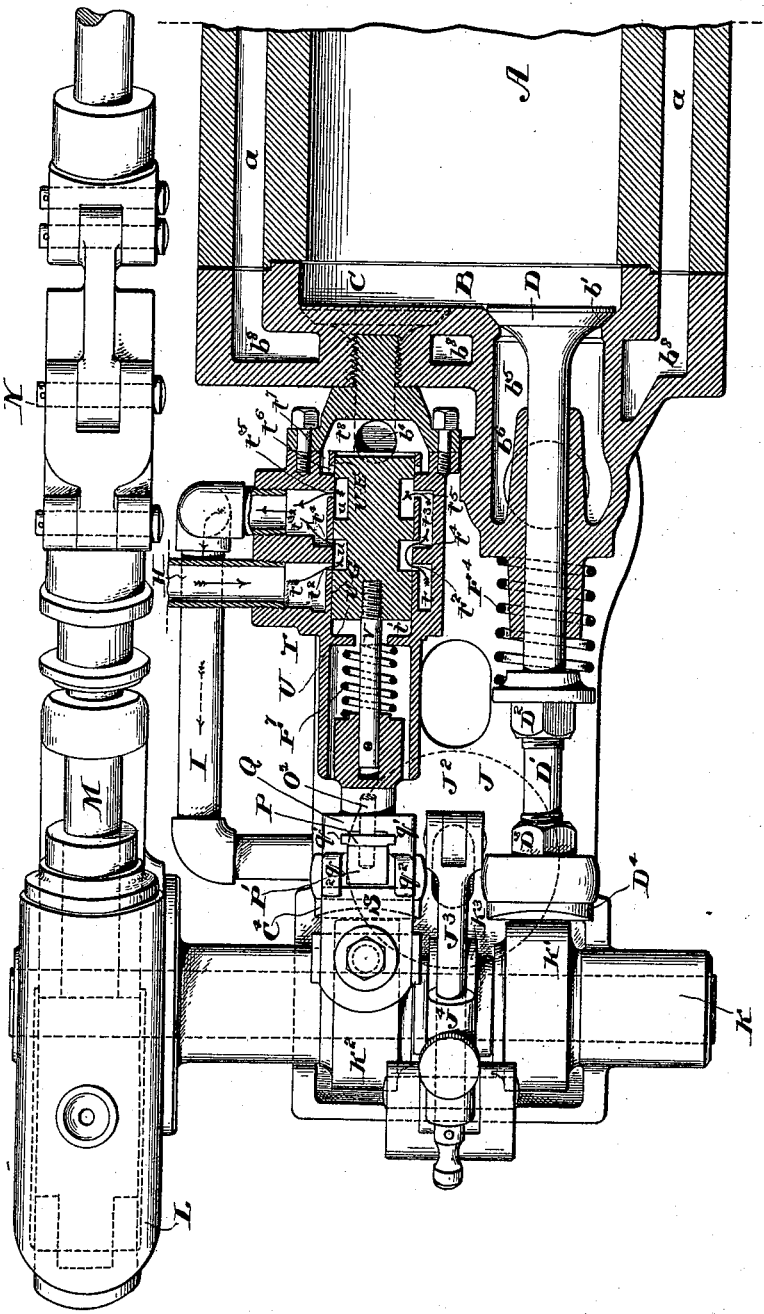

Figure 1 is an elevation showing the valve and valve-acting mechanism of an engine provided with my improvement, said view being taken on the section-line $xx$ of Fig. 2. Fig. 2 is a plan view of the same parts of the apparatus partly sectioned on the line $v\ v$ of Fig. 1. Fig. 3 is a view in elevation, taken on the section-line $z\ z$ of Fig. 4, said view showing a gas-pump, which forms an important feature of my apparatus and the immediate connections of said pump. Fig. 4 is a plan view similar to that shown in Fig. 2, but omitting certain parts of the mechanism shown in Fig. 2 for the sake of clearness. Fig. 5 is an end view of the apparatus, omitting the air and exhaust valve and their connections, taken partly on the line $y\ y$ of Fig. 4. Fig. 6 represents in perspective certain of the devices connected with the governor and valve-actuating mechanism. Fig. 7 illustrates a modification of the gas-pump; Fig. 8, another modification of the gas-pump, said modification being the one which I prefer to use. Fig. 9 is a plan, partly in section, illustrating a modification in the construction of certain of the valves of the engine; and Figs. 10 and 11 are enlarged views showing the said modified valves in two positions.

A is the cylinder of the gas-engine; B, the cylinder-head; C, the admission-valve; D, the exhaust-valve.

$a$ and $b^8$ are water-spaces in the castings of the cylinder and its head.

$b$ is the valve-seat of the admission-valve C, $b'$ the valve-seat of the exhaust-valve D.

$b^2$ is the admission-valve chamber, into which chamber leads an air-supply pipe $b^3$ and a port $b^4$, which said port connects with a conduit leading from the gas-supply. The immediate connection shown in the drawings is with a port $e$, leading into the chamber $e'$ of a valve-casing E, said casing also containing a second chamber $e^2$, the two chambers being connected by the seated passage $e^3$. An opening $e^4$ leads from chamber $e^2$ into the chamber $g$ of the valve-casing G, said casing also containing the chamber $g'$, separated from chamber $g$ by the seated passage $g^2$. Leading into the chamber $g'$ is the gas-supply pipe H.

$b^5$ is the exhaust-valve chamber, from which leads a passage $b^6$, opening to the air.

$b^7$ (see Fig. 1) is the ignition-port of the engine. The admission-valve C of the engine is attached to the valve-rod C' and held to its seat by the spring $F^3$, pressing against the cylinder-head and against a stop-nut $C^2$.

$C^4$ is an adjustable head on the end of rod C', and $C^3$ an adjusting-nut. The exhaust-valve D is attached to the valve-spindle D' and held to its seat by means of the spring $F^4$, abutting against the end of the cylinder-head and against the stop-nut $D^2$, and $D^4$ is the adjustable head on the end of rod D', and $D^3$ the adjusting-nut. These valves are actuated in the usual way by means of cams K' and $K^2$, secured on the cam-shaft K, which shaft is actuated from the shaft M by means of a worm and pinion, which are not shown in the drawings, but which would be included in the casing L. (See Figs. 1 and 2.) The shaft M is of course driven from the main shaft of the engine. The valve-casings G and E are used in the construction which is illustrated in Figs. 1 to 5, inclusive, in which construction they are interposed in and form part of the conduit leading from the gas-supply to the admission-valve chamber.

In Figs. 9, 10, and 11 an equivalent construction is shown, which will be hereinafter described. In the valve-chamber E is the valve E', which is normally seated on the valve-seat $e^3$. This valve is attached to a spindle $E^2$ and held to its seat by means of the spring F placed between the end of the chamber E and the adjusting-nut $E^3$. The extreme end of the spindle $E^2$ enters an opening $q$ in the end of a peculiarly-formed head Q (see Figs. 4 and 6,) and the spring $F'$ is situated between the adjusting-nut $E^3$ and the head Q and operates to force the said head in a direction away from the end of the spindle.

In the valve-chamber G is the valve $G'$, which is attached to a valve-spindle $G^2$. This valve-spindle passes through an arm R, which is held upon it by means of the collar $G^4$ at the end of the valve-spindle and the spring $F^5$ pressing against the arm R and against the collar $G^3$ on the spindle. The arm or bar R is secured to the head Q, as shown. This head Q, besides having the opening $q$ already referred to and into which the end of valve-spindle $E^2$ projects, has also projecting-arms $q^2$ $q^2$ upon its sides, between which are vertical guides $q'$ and in which are horizontal guides $q^3$. In the vertical guides $q'$ moves a plate P, having a projecting block $P'$, extending between the arms $q^2$ of the head Q, and the vertical position of the slide P and its block is regulated by means of the governor N, situated on the shaft M by means of lever O, rock-shaft $O'$, and lever $O^2$. (See Figs. 1 and 2.)

S is a plate, which moves in the horizontal guides $q^3$ of the head Q and is attached to a bracket $S'$, which bracket is attached to and moves with the spindle $C'$ of the admission-valve.

I is a pipe leading, as shown, from the chamber $e^2$ of the valve-casing—that is, from a point between the valves $E'$ and $G'$. The pipe I also connects with a gas-pump J, the piston of which is indicated by the letter $J'$ and is actuated by a cam $K^3$ on shaft K, which cam moves against the arm $J^6$ of a lever pivoted at $J^5$, and through the other arm $J^4$ of which passes a rod $J^3$, adjustable in length in arm $J^4$ by means of the set-screw $j$. The arm $J^3$ is pivoted to the end of the connecting-rod $J^2$, which is also pivoted to the piston, as shown. A spring $F^6$ is employed to thrust the piston of pump J up, the cam and its connections simply effecting the downward stroke thereof.

The operation of the engine may be briefly described as follows: The valves C, D, and $E'$ are all normally held in their closed position by means of the springs $F^3$, $F^4$, and F. The valve $G'$, on the other hand, is normally held open by the action of spring $F'$, acting through the arm R on its stem $G^2$. While the valves are in this position the cam $K^3$ permits the spring $F^6$ to raise the piston of pump J, drawing the pump-cylinder and its connection I full of gas, which passes, of course, freely from the supply-pipe H and past the open valve $G'$. The cam $K^2$ next comes into operation, pressing against the head $C^4$ of valve-spindle $C'$ and opening the admission-valve C. At the same time the bracket $S'$ moves forward with the spindle $C'$, to which it is attached, and forces the plate S forward toward the head Q. The end of plate S comes in contact with the block $P'$, and acting through it, it also moves the head Q and the bar or arm R, which is attached to said head, and said bar R, acting through spring $F^5$, moves the valve-spindle $G^2$ and seats the valve $G'$, thus cutting off any further supply of gas from the service-pipe H. At or immediately after the time when the head Q is moved far enough to close the valve $G'$, as described, it comes into operative contact with the end of the spindle $E^2$, and its further movement acting through said spindle opens the valve $E'$, thus making a free passage from the pump J through pipe I and valve-casing E to the admission-valve chamber of the engine. It will be noticed that the spring $F'$ will yield after the valve $G'$ is seated and that (see Fig. 4) a clearance is left between the end of the valve-stem $E^2$ and the head Q substantially equal to the distance through which the valve $G'$ travels to seat itself. The cam $K^3$ next comes into operation acting through the mechanism already referred to and forcing down the piston in the pump J, the gas from which is thus forced into the admission-valve chamber of the engine, and the valve C, being now open and the engine-piston (not shown) making its suction-stroke, the said regulated supply of gas is drawn into the engine-cylinder, together with a proper admixture of air, entering through the passage $b^3$. The valve C is then permitted by its operative cam $K^2$ to close, the charge in the engine ignited, and, after the explosion and working stroke has taken place, the cam $K'$, acting on the head $D^4$ of valve-spindle $D'$, opens the valve D, permitting the products of combustion to escape. When the speed of the engine exceeds a determined amount, the governor N, acting through the lever O, rock-shaft $O'$, and lever $O^2$, draws the slide or plate P up and elevates the projecting block $P'$ above the level of the plate S, so that the said plate moves in the horizontal guides $q^3$ of the head Q without moving said head or the parts above described as connected with it. The valve $E'$ therefore remains seated, and no gas is permitted to escape into the admission-valve chamber. The valve $G'$ remains open and the gas which is drawn into the pump during its suction-stroke is simply forced back through valve $G'$ into the service-pipe H.

In Fig. 3 the stroke of the pump is regulated by the adjustment of the arm $J^3$ in the arm $J^4$ of the pivoted lever, the shortening of this arm of course diminishing the stroke of the piston and the lengthening of the arm increasing its stroke.

In Fig. 7 I have illustrated a modification of the gas-pump in which a bellows (marked $J^7$) is shown as an obvious mechanical equivalent for the pump. Any device adapted to alternately draw in and expel a regulated quantity of gas can be used as a gas-pump in my device.

In Fig. 8 I have shown a modification of the pump-actuating mechanism, which modification I prefer for use to that illustrated in the other figures, as it enables me to regulate and vary the movement of the pump-piston J' in its upward travel, while at the same time the said piston is always forced to the same level in its downward movement. In the construction illustrated in said Fig. 8 the arm $J^3$ is permanently fastened to the arm $J^4$ of the pivoted lever. An additional arm $J^8$ also extends from this lever, and at the end of said arm a point $J^{11}$ is arranged to come in contact with an adjustable stop $J^{10}$, screwing on a projection $J^9$ of the bracket, which supports the pivot $J^5$. By adjusting the stop $J^{10}$ the upward movement of the piston J' is limited and the quantity of gas which the pump will take in at each stroke thus regulated, while at the same time the piston always moves down to the same extent in expelling the gas.

Referring next to Figs. 9, 10, and 11 it will be seen that in place of the valve-chambers E and G, I have here substituted a cylindrical valve-chamber T, in the internal cavity $t'$ of which moves a piston-valve U, having three rings separating the annular spaces $u$ $u'$. A passage $t$ connects the valve-casing with the gas-service pipe H, and from this passage an annular port $t^2$ leads to the interior chamber of the valve-casing. Another passage $t^3$ connects the casing with the pipe I, which leads to the gas-pump and is connected with the interior chamber of the valve-casing by ports $t^4$ and $t^5$. Still another passage (see $t^7$ and $t^8$) connects, as through $b^4$, with the admission-valve chamber of the engine and also by a port $t^6$ with the interior chamber of the valve-casing. Instead of connecting chamber $t^8$ at the end of the valve-casing with the admission-valve chamber of the engine, as shown in Fig. 9, connection may be made therewith by a pipe entering the valve-chamber T at $t^9$. (See Figs. 10 and 11.) This of course is a mere immaterial detail of construction. The piston-valve U is actuated through the valve-stem V by block Q, to which in this construction the stem V is rigidly connected, so that they always move together. A spring $F^7$ is arranged to act on the valve-stem, as shown, and keep the piston-valve U normally in the position shown in Figs. 9 and 10. In this position the opening from the gas-service pipe to the pipe I is open, the gas passing freely through passage $t$ and port $t^2$ into the cavity $u$ of the valve, and thence, as shown in Figs. 9 and 10, through port $t^4$ and through cavity $u'$ and port $t^5$ into the passage $t^8$, and through pipe I to the pump. The head Q is then thrust forward, as before, and, acting through valve-stem V, it first closes the port $t^2$ and then opens the port $t^6$, Fig. 11, so that on the expulsion-stroke of the pump the regulated quantity of gas is forced through port $t^5$ into the space $u'$ of the valve and thence through port $t^6$ into passage $t^7$ and $t^8$, whence it enters the admission-valve chamber of the engine. It will thus be seen that the piston-ring marked U G of the valve is in its function and mode of operation the equivalent of the valve G', and that the piston-ring marked U E is likewise the equivalent of the valve E'.

The construction last described being somewhat simpler than that previously described by me, I prefer in practice to use it, although the same beneficial results are obtained in like manner by both constructions.

The advantage derived from my invention is that a uniform or substantially-uniform mixture of gas and air is always supplied to the engine-cylinder both in starting the engine or when it is running at varying speeds, as well as where it is running at a uniform normal speed, and the disadvantages well known to follow a variation in the explosive mixture are thus avoided.

Advantageous results can be obtained by measuring and supplying to the engine-cylinder charges of both gas and air or by measuring the charges of air and permitting the gas to flow freely from the service-pipe at a substantially-uniform pressure.

In another application filed simultaneously with this I have claimed the process of measuring either of the constituents of the explosive charge and the specific measurement of the charges of air.

The present application is confined to the specific measurement of the gas charges and to the improvements in the mechanism of the engine especially adapted for use with this specific method.

Having now described my invention, what I claim as new, and desire to secure by Letters Patent, is—

1. In a gas-engine, the combination, with a conduit leading from the source of gas-supply to the admission-valve chamber, of an admission-valve controlling the opening from said chamber to the cylinder, a valve, as E', controlling the opening of said conduit into the said valve-chamber, a valve, as G', arranged to close the conduit in advance of valve E', and a pump, as J', or its equivalent, connected with the conduit between said valves and operative mechanism, as specified, and whereby the suction-stroke of the pump is made while the valve E' is closed and valve G' open.

2. In a gas-engine, the combination, with a conduit leading from the source of gas-supply to the admission-valve chamber, of an admission-valve controlling the opening from said chamber to the cylinder, a valve, as E', controlling the opening of said conduit into the said valve-chamber, a valve, as G', arranged to close the conduit in advance of valve E', mechanism for actuating said valves, as described, and whereby the valve G' is closed in advance of the opening of valve E', a pump, as J, or its equivalent, connecting with the conduit between said valves, and pump-actuating mechanism arranged to actuate the pump, as described, and so as to effect its suction-stroke while valve E' is closed.

3. In a gas-engine, the combination, with a conduit leading from the source of gas-supply to the admission-valve chamber, of an admission-valve controlling the opening from said chamber to the cylinder, a normally-closed valve, as E', leading to the admission-valve chamber, a normally-open valve, as G', situated in advance of valve E', valve-actuating mechanism arranged, as described, to close valve G' in advance of the opening of valve E' and to close valve E' in advance of the opening of valve G', a pump, as J, or its equivalent, connecting with the conduit between valves E' and G', pump-actuating mechanism arranged to make the suction-stroke while valve E is closed, a governor, and connections from said governor to the valve-actuating mechanism adapted to throw the said mechanism out of operation as the speed of the engine exceeds a determined rate.

4. In a gas-engine, the combination, with the gas-service conduit, of the cylinder-valve casing T, having ports $t^2$, $t^4$, $t^5$, and $t^6$ and connections, as described, the piston-valve U, having packing-rings U G and U E, adapted to alternately and reciprocally close and open ports $t^2$ and $t^6$, and a third ring arranged to work between the ports $t^4$ and $t^5$, and a gas-pump connecting with said valve-casing, as specified.

5. In a gas-engine, the combination of the valves G' and E' or their equivalents situated in the conduit through which gas is supplied to the engine, a gas-pump, as J, connecting with said conduit between said valves and adapted, as described, to deliver measured charges of gas to the engine, a reciprocating plate, as S, arranged, as specified, to actuate the valves, a governor, and a block, as P', connected with the governor and arranged, as specified, in the path of plate S, and so that the said plate is thrown out of operative connection with the valves when the block moves beyond a determined position.

HENRY WARDEN.

Witnesses:
LEWIS R. DICK,
JOSHUA MATLACK, Jr.